(12) United States Patent
Bouazizi et al.

(10) Patent No.: US 11,310,302 B2
(45) Date of Patent: Apr. 19, 2022

(54) METHOD AND APPARATUS FOR STREAMING DASH CONTENT OVER BROADCAST CHANNELS

(71) Applicant: Samsung Electronics Co., Ltd., Suwon-si (KR)

(72) Inventors: Imed Bouazizi, Plano, TX (US); Youngkwon Lim, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1359 days.

(21) Appl. No.: 14/592,640

(22) Filed: Jan. 8, 2015

(65) Prior Publication Data

US 2015/0195327 A1    Jul. 9, 2015

Related U.S. Application Data

(60) Provisional application No. 61/925,486, filed on Jan. 9, 2014.

(51) Int. Cl.
*H04L 29/06* (2006.01)
*H04L 65/65* (2022.01)
(Continued)

(52) U.S. Cl.
CPC ........ *H04L 65/608* (2013.01); *H04L 65/4076* (2013.01); *H04L 65/4084* (2013.01); *H04L 65/602* (2013.01); *H04L 65/80* (2013.01)

(58) Field of Classification Search
CPC ............... H04L 65/608; H04L 65/4076; H04L 65/4084; H04L 65/602; H04L 65/80
(Continued)

(56) References Cited

U.S. PATENT DOCUMENTS

2012/0259994 A1*  10/2012  Gillies ............... H04L 12/1881
                                                              709/231
2013/0046861 A1   2/2013  Biderman et al.
(Continued)

FOREIGN PATENT DOCUMENTS

KR    10-2012-0034550 A    4/2012
KR       20120122994 A    11/2012
(Continued)

OTHER PUBLICATIONS

International Search Report dated Mar. 23, 2015 in connection with International Patent Application No. PCT/KR2015/000239, 6 pages.
(Continued)

*Primary Examiner* — Vivek Srivastava
*Assistant Examiner* — Hien V Doan

(57) ABSTRACT

A user equipment is provided for providing content. The user equipment comprising at least one memory and at least one processing device. The at least one process is configured to receive a data stream over a network, the data stream comprising un-segmented media data for the content. The at least one process is also configured to identify segment boundaries in the un-segmented media data to identify segments and determine a segment number for each of the identified segments from a media presentation description (MPD) based on the segment boundaries. The at least one process is also configured to retrieve a uniform resource locator (URL) associated with each of a plurality of dynamic adaptive streaming over hypertext transfer protocol (DASH) segments based on the segment number for each of the plurality of DASH segments and provide the URL associated with each of the plurality of DASH segments to a client player.

20 Claims, 7 Drawing Sheets

(51) Int. Cl.
*H04L 65/611* (2022.01)
*H04L 65/612* (2022.01)
*H04L 65/80* (2022.01)
*H04L 65/60* (2022.01)

(58) Field of Classification Search
USPC .......................................................... 709/219
See application file for complete search history.

(56) References Cited

U.S. PATENT DOCUMENTS

| | | | |
|---|---|---|---|
| 2013/0060911 A1* | 3/2013 | Nagaraj | H04N 21/234327 |
| | | | 709/219 |
| 2013/0124749 A1* | 5/2013 | Thang | H04L 65/4092 |
| | | | 709/231 |
| 2013/0268761 A1 | 10/2013 | Giladi | |
| 2014/0337903 A1* | 11/2014 | Zhu | H04N 21/6587 |
| | | | 725/90 |

FOREIGN PATENT DOCUMENTS

| | | |
|---|---|---|
| KR | 10-2014-0002026 A | 1/2014 |
| WO | WO 2013/184248 A1 | 12/2013 |

OTHER PUBLICATIONS

Written Opinion of International Searching Authority dated Mar. 23, 2015 in connection with International Patent Application No. PCT/KR2015/000239, 4 pages.

Examination Report in connection with Korean Patent Application No. 10-2016-7021728 dated Oct. 26, 2020, 12 pages.

\* cited by examiner

METHOD AND APPARATUS FOR STREAMING DASH CONTENT OVER BROADCAST CHANNELS

CROSS-REFERENCE TO RELATED APPLICATION(S) AND CLAIM OF PRIORITY

The present application claims priority to U.S. Provisional Patent Application Ser. No. 61/925,486, filed Jan. 9, 2014, entitled "METHODS AND APPARATUS FOR STREAMING DASH CONTENT OVER BROADCAST CHANNELS". The content of the above-identified patent document is incorporated herein by reference.

TECHNICAL FIELD

The present application relates generally to steaming DASH content and, more specifically, to retrieving DASH segments by identifying DASH segment boundaries.

BACKGROUND

Moving Picture Experts Group (MPEG) Media Transport (MMT) specifies a modern media delivery solution to enable realization of multimedia services over heterogeneous Internet Protocol (IP) network environments. The delivered coded media data includes both (i) audiovisual media data requiring synchronized decoding and presentation of specific units of data in designated times (namely timed data) and (ii) other types of data that could be decoded and presented at arbitrary times based on the context of a service or based on interaction by a user (namely non-timed data).

MMT is designed under the assumption that the coded media data will be delivered through a packet-based delivery network using Internet Protocols such as the User Datagram Protocol (UDP). Several characteristics of such delivery environments have also been considered. The end-to-end delay of delivery of each packet from a sending entity to a receiving entity is not always constant, and the underlying network provides means to distinguish signaling messages from media data.

SUMMARY

A user equipment is provided for providing content. The user equipment comprising at least one memory and at least one processing device. The at least one process is configured to receive a data stream over a network, the data stream comprising un-segmented media data for the content. The at least one process is configured to identify segment boundaries in the un-segmented media data to identify segments. The at least one process is also configured to determine a segment number for each of the identified segments from a media presentation description (MPD) based on the segment boundaries. The at least one process is also configured to retrieve a uniform resource locator (URL) associated with each of a plurality of dynamic adaptive streaming over hypertext transfer protocol (DASH) segments based on the segment number for each of the plurality of DASH segments. The at least one process is also configured to provide the URL associated with each of the plurality of DASH segments to a client player.

A method is provided for providing content. The method includes receiving a data stream over a network, the data stream comprising un-segmented data for the content. The method also includes identifying segment boundaries in the un-segmented media data to identify segments. The method also includes determining a segment number for each of the identified segments from a media presentation description (MPD) based on the segment boundaries. The method also includes retrieving a uniform resource locator (URL) associated with each of a plurality of dynamic adaptive streaming over hypertext transfer protocol (DASH) segments based on the segment number for each of the plurality of DASH segments. The method also includes providing the URL associated with each of the plurality of DASH segments to a client player.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
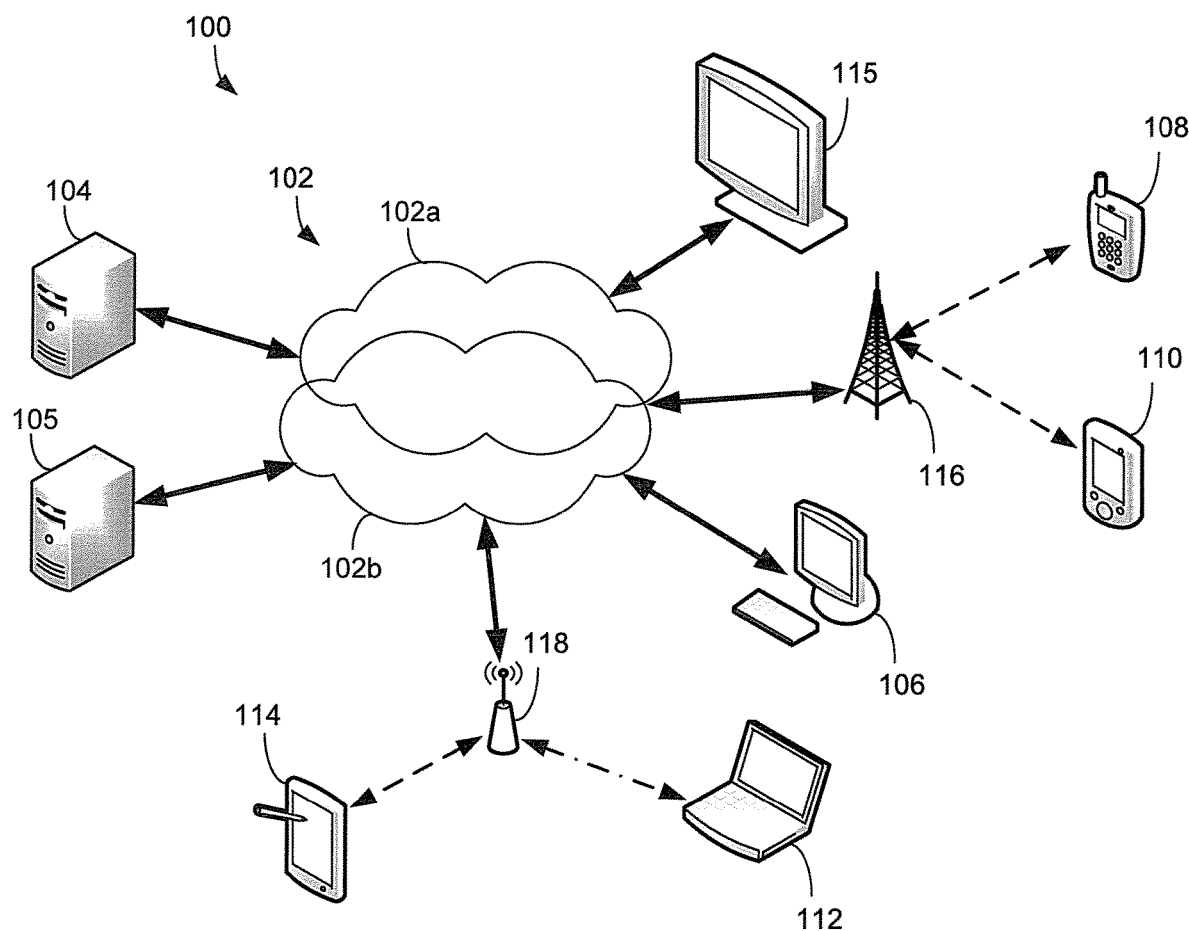
FIG. 1 illustrates an example communication system in which various embodiments of the present disclosure may be implemented.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method.

For convenience of description, the following terms and phrases used in this patent document are defined.

Dynamic Adaptive Streaming over HTTP (DASH)—A typical scheme of adaptive streaming, which changes server-controlled adaptive streaming to client-controlled adaptive streaming. In server-controlled adaptive streaming, a server has information about its connections to all connected clients and generates what each client requires, thereby transmitting optimal content for each network situation. Disadvantageously, however, the server may be overloaded as the clients increase in number. In DASH, the server generates media segments and metadata in advance for several possible cases, and the clients request and play content depending on the situation. This makes it possible to download and play the optimal content depending on the network conditions while reducing the load placed on the server.

Content—Examples of content include audio information, video information, audio-video information, and data. Content items may include a plurality of components as described below.

Components—Refers to components of a content item, such as audio information, video information, and subtitle information. For example, a component may be a subtitle stream composed in a particular language or a video stream obtained at a certain camera angle. The component may be referred to as a track or an Elementary Stream (ES) depending on its container.

Content Resources—Refer to content items (such as various qualities, bit rates, and angles) that are provided in a plurality of representations to enable adaptive streaming for content items. A service discovery process may be referred to as content resources. The content resources may include one or more consecutive time periods.

Period—Refers to a temporal section of content resources.

Representations—Refer to versions (for all or some components) of content resources in a period. Representations may be different in a subset of components or in encoding parameters (such as bit rate) for components. Although representations are referred to here as media data, they may be referred to as any terms indicating data, including one or more components, without being limited thereto.

Segment—Refers to a temporal section of representations, which is named by a unique Uniform Resource Locator (URL) in a particular system layer type (such as Transport Stream (TS) or Moving Picture Experts Group (MPEG)-4 (MP4) Part 14).

MMT coding and media delivery is discussed in the following document and standards description: MPEG-H Systems, Text of ISO/IEC 2nd CD 23008-1 MPEG Media Transport, which is hereby incorporated into the present disclosure as if fully set forth herein. MMT defines three functional areas including encapsulation, delivery, and signaling. The encapsulation functional area defines the logical structure of media content, the MMT package, and the format data units to be processed by an MMT compliant entity. An MMT package specifies components including media content and the relationship among the media content to provide information needed for adaptive delivery. The format of the data units is defined to encapsulate the coded media to either be stored or carried as a payload of a delivery protocol and to be easily converted between storage and carrying. The delivery functional area defines the application layer protocol and format of the payload. The application layer protocol provides enhanced features, including multiplexing, for delivery of the MMT package compared to conventional application layer protocols for the delivery of multimedia. The payload format is defined to carry coded media data that is agnostic to the specific media type or encoding method. The signaling functional area defines the format of messages to manage delivery and consumption of MMT packages. Messages for consumption management are used to signal the structure of the MMT package, and messages for delivery management are used to signal the structure of payload format and configuration of the protocol.

MMT defines a new framework for delivery of time continuous multimedia, such as audio, video, and other static content, such as widgets, files, etc. MMT specifies a protocol (i.e., MMTP) for the delivery of an MMT package to a receiving entity. The MMTP signals transmission time of the MMTP package as part of the protocol header. This time enables the receiving entity to perform de-jittering by examining the transmission time and reception time of each incoming MMT packet.

For efficient and effective delivery of coded media data over heterogeneous IP network environments, MMT provides the following elements:

a logical model to construct a content composed of various components for mash-up applications;

a structure of data to convey information about the coded media data for delivery layer processing, such as packetization and adaptation;

a packetization method and a structure of packets to deliver media content agnostic to specific types of media or coding methods used over TCP or UDP, including hybrid delivery;

a format of signaling messages to manage presentation and delivery of media content; and a format of information to be exchanged across layers to facilitate cross-layer communication.

One or more embodiments of this disclosure recognize and take into account that the Transmission Control Protocol (TCP) is not suitable for the delivery of real-time media, such as audio and video content. This is mainly due to the aggressive congestion control algorithms and the retransmission procedures that TCP implements. In TCP, a sender reduces its transmission rate significantly (typically by half) upon detection of a congestion event, typically recognized through packet loss or excessive transmission delays. As a consequence, the transmission throughput of TCP is usually characterized by the well-known saw-tooth shape. This behavior is detrimental for streaming applications that are often delay-sensitive but relatively loss-tolerant, whereas TCP sacrifices delivery delay in favor of reliable and congestion-aware transmission.

One or more embodiments of this disclosure recognize and take into account that Hypertext Transport Protocol (HTTP) is used for delivery of multimedia content over the Internet. HTTP runs on top of TCP and is a textual protocol. The reason for this shift is attributable to the ease of deployment of the protocol. There is no need to deploy a dedicated server for delivering content. Furthermore, HTTP is granted access through firewalls and NATs, which significantly simplifies deployment.

Dynamic Adaptive HTTP Streaming (DASH) has been standardized recently by 3GPP and MPEG. Several other proprietary solutions for adaptive HTTP streaming, such APPLE's HTTP Live Streaming (HLS) and MICROSOFT's Smooth Streaming, are also being commercially deployed. Contrary to those approaches, DASH is a fully open and standardized media streaming solution, which drives interoperability among different implementations.

FIG. 1 illustrates an example communication system 100 in which various embodiments of the present disclosure may be implemented. The embodiment of the communication system 100 shown in FIG. 1 is for illustration only. Other embodiments of the communication system 100 could be used without departing from the scope of this disclosure.

As shown in FIG. 1, the system 100 includes a heterogeneous network 102, which facilitates communication between various components in the system 100. For example, the network 102 may communicate Internet Protocol (IP) packets, frame relay frames, Asynchronous Transfer Mode (ATM) cells, or other information between network addresses. The network 102 may also be a heterogeneous network including broadcasting networks, such as cable and satellite communication links. The network 102 may include one or more local area networks (LANs); metropolitan area networks (MANs); wide area networks (WANs); all or a portion of a global network, such as the Internet; or any other communication system or systems at one or more locations.

In various embodiments, heterogeneous network 102 includes a broadcast network 102a and a broadband network 102b. Broadcast network 102a is designed for broadcast of media data to client devices 106-115 which is generally one way, e.g., from one or more of the servers 104-105 to the client devices 106-115. Broadcast network 102a may include any number of broadcast links and devices, such as, for example, satellite, wireless, wireline, and fiber optic network links and devices.

Broadband network 102b is designed for broadband access to media data for client devices 106-115 which is generally two way, e.g., back and forth from one or more of the servers 104-105 to the client devices 106-115. Broadband network 102b may include any number of Broadband links and devices, such as, for example, Internet, wireless, wireline, and fiber optic network links and devices.

The network 102 facilitates communications between servers 104-105 and various client devices 106-115. Each of the servers 104-105 includes any suitable computing or processing device that can provide computing services for one or more client devices. Each of the servers 104-105 could, for example, include one or more processing devices, one or more memories storing instructions and data, and one or more network interfaces facilitating communication over the network 102. For example, the servers 104-105 may include servers that broadcast media data over a broadcast network in network 102 using MMTP. In another example, the servers 104-105 may include servers that broadcast media data over a broadcast network in network 102 using DASH.

Each client device 106-115 represents any suitable computing or processing device that interacts with at least one server or other computing device(s) over the network 102. In this example, the client devices 106-115 include a desktop computer 106, a mobile telephone or smartphone 108, a personal digital assistant (PDA) 110, a laptop computer 112, a tablet computer 114; and a set-top box and/or television 115. However, any other or additional client devices could be used in the communication system 100.

In this example, some client devices 108-114 communicate indirectly with the network 102. For example, the client devices 108-110 communicate via one or more base stations 116, such as cellular base stations or eNodeBs. Also, the client devices 112-115 communicate via one or more wireless access points 118, such as IEEE 802.11 wireless access points. Note that these are for illustration only and that each client device could communicate directly with the network 102 or indirectly with the network 102 via any suitable intermediate device(s) or network(s). As described in more detail below, any and all of the client devices 106-115 may include a hybrid architecture for receiving and presenting broadcast and broadband media data using MMT and DASH.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
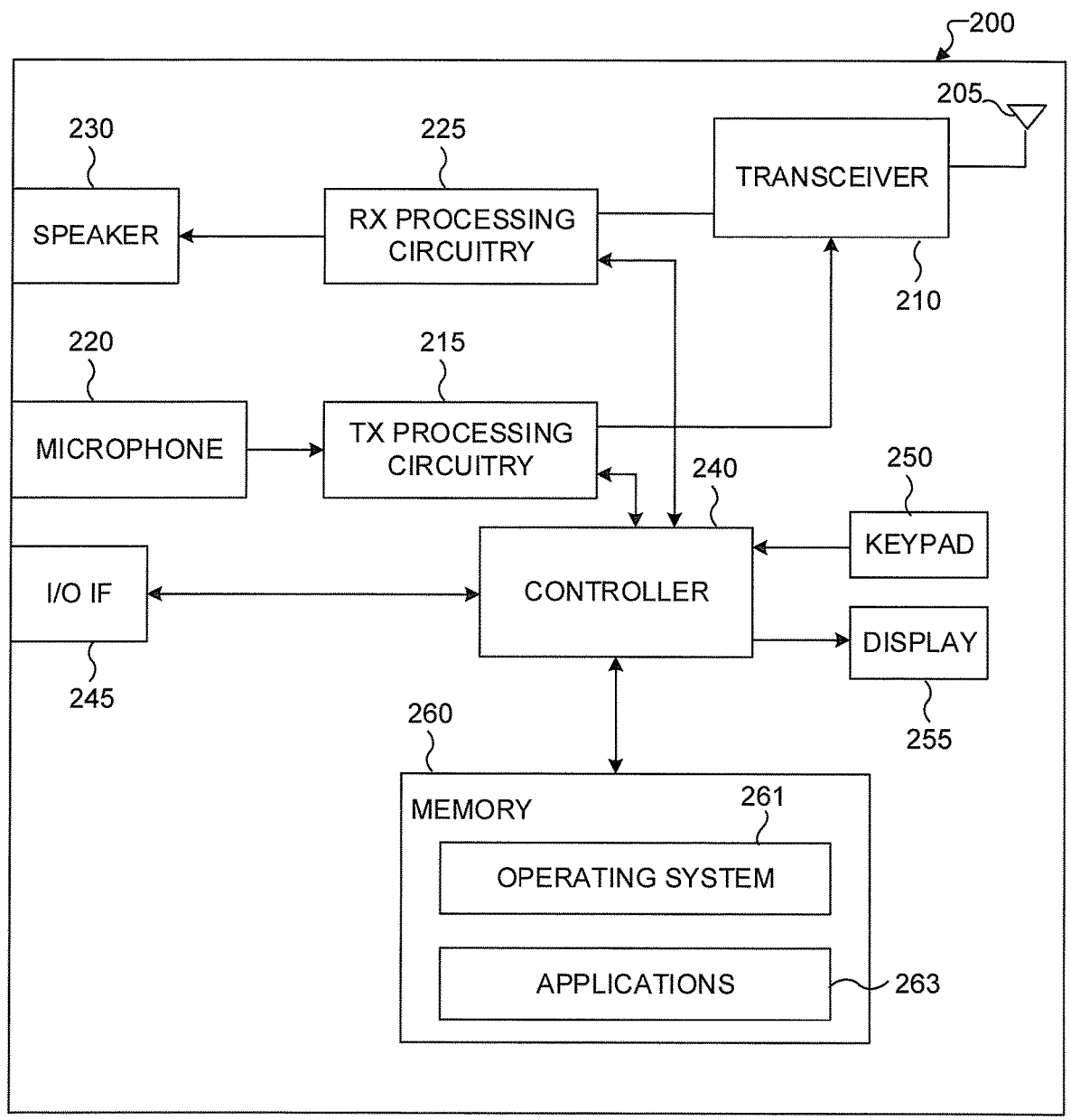
FIG. 2 illustrates an example device in a computing system according to this disclosure.

FIG. 2 illustrates an example device in a computing system according to this disclosure. In particular, FIG. 2 illustrates an example client device 200. The client device 200 could represent one or more of the client devices 106-115 in FIG. 1.

As shown in FIG. 2, the client device 200 includes an antenna 205, a transceiver 210, transmit (TX) processing circuitry 215, a microphone 220, and receive (RX) processing circuitry 225. The client device 200 also includes a speaker 220, a controller 240, an input/output (I/O) interface (IF) 245, a keypad 250, a display 255, and a memory 260. The memory 260 includes an operating system (OS) 261 and one or more applications 263.

The transceiver 210 receives, from the antenna 205, an incoming RF signal transmitted by another component in a system. The transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller 240 for further processing (such as for web browsing data).

The TX processing circuitry 215 receives analog or digital voice data from the microphone 220 or other outgoing baseband data (such as web data, e-mail, or interactive video game data) from the controller 240. The TX processing circuitry 215 encodes, multiplexes, and/or digitizes the outgoing baseband data to generate a processed baseband or IF signal. The transceiver 210 receives the outgoing processed baseband or IF signal from the TX processing circuitry 215 and up-converts the baseband or IF signal to an RF signal that is transmitted via the antenna 205.

The controller 240 can include one or more processors or other processing devices and execute the basic operating system 261 stored in the memory 260 in order to control the overall operation of the client device 200. For example, the controller 240 could control the reception of forward channel signals and the transmission of reverse channel signals by the transceiver 210, the RX processing circuitry 225, and the TX processing circuitry 215 in accordance with well-known principles. In some embodiments, the controller 240 includes at least one microprocessor or microcontroller.

The controller 240 is also capable of executing other processes and programs resident in the memory 260. The controller 240 can move data into or out of the memory 260 as required by an executing process. In some embodiments, the controller 240 is configured to execute the applications 263 based on the operating system 261 or in response to signals received from external devices or an operator. The controller 240 is also coupled to the I/O interface 245, which provides the client device 200 with the ability to connect to other devices, such as laptop computers and handheld computers. The I/O interface 245 is the communication path between these accessories and the controller 240.

The controller 240 is also coupled to the keypad 250 and the display 255. The operator of the client device 200 can use the keypad 250 to enter data into the client device 200. The display 255 may be a liquid crystal display or other display capable of rendering text and/or at least limited graphics, such as from web sites.

The memory 260 is coupled to the controller 240. Part of the memory 260 could include a random access memory (RAM), and another part of the memory 260 could include a Flash memory or other read-only memory (ROM).

As described in more detail below, client device 200 may include a hybrid architecture for receiving and presenting broadcast and broadband media data using MMT and DASH.

Although FIG. 2 illustrates an example of a device in a computing system, various changes may be made to FIG. 2. For example, various components in FIG. 2 could be combined, further subdivided, or omitted, and additional components could be added according to particular needs. As a particular example, the controller 240 could be divided into multiple processors, such as one or more central processing units (CPUs) and one or more graphics processing units (GPUs). Also, while FIG. 2 illustrates the client device 200 configured as a mobile telephone or smartphone, client devices could be configured to operate as other types of mobile or stationary devices including, for example, without limitation, a set-top box, a television, and a media streaming device. In addition, as with computing and communication networks, client devices and servers can come in a wide variety of configurations, and FIG. 2 does not limit this disclosure to any particular client device or server.

Figure 3:
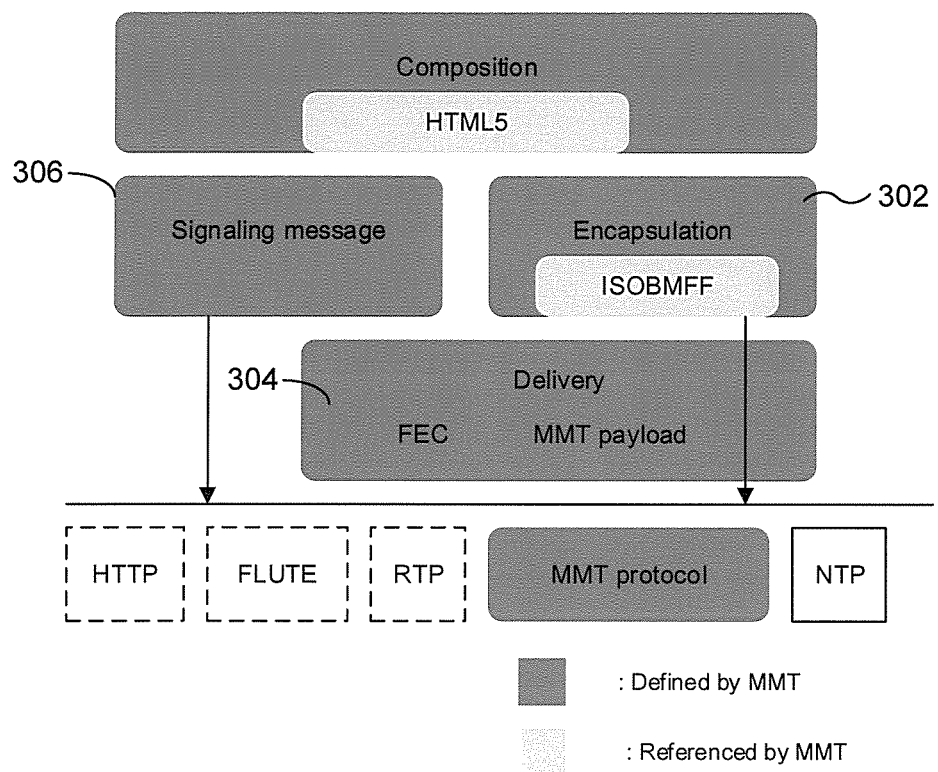
FIG. 3 illustrates example functionalities provided by MMT according to this disclosure.

FIG. 3 illustrates example functionalities provided by MMT according to this disclosure. The embodiment shown in FIG. 3 is for illustration only. Other embodiments could be used without departing from the scope of this disclosure.

Functionalities provided by MMT are categorized into functional areas, namely a composition area, an encapsulation area 302, a delivery area 304, and a signaling area 306. The encapsulation area 302 defines the logical structure of media content, an MMT package, and a format of the data units to be processed by an MMT-compliant entity. An MMT package includes one or more components having media content and descriptions of relationships among the components to provide information to the underlying delivery area 304 for adaptive operation. The format of the data units is defined to encapsulate the coded media data of the media content to be stored or carried as a payload of a delivery protocol and to be easily converted between different delivery protocols.

The delivery area 304 defines a transport protocol (MMTP) and a payload format. MMTP provides enhanced features for delivery of media data compared to conventional file delivery protocols such as FLUTE. The payload format is defined to carry ISO-media base file format encapsulated coded media data in a way agnostic to the specific media type or encoding method.

The signaling area 306 defines the format of messages to manage delivery and consumption of MMT packages. Messages for consumption management are used to signal the structure of MMT Package and messages for delivery management are used signal the structure of payload format and configuration of the protocol.

The encapsulation area 302 defines a logical structure of the media content, the MMT Package, and the format of the data units to be processed by the MMT compliant entity. The MMT Package specifies the components comprising media content and the relationship among them to provide necessary information for presentation and adaptive delivery. The format of the data units is defined to encapsulate the coded media either to be stored or to be carried as a payload of a delivery protocol, and to be easily converted between the different formats.

Any type of data that can be individually consumed by an entity directly connected to an MMT client is a separate MMT asset. This includes not only coded media data decodable by a single media codec but also other types of data that have already been multiplexed. MPUs provide information about the media data for adaptive packetization according to the constraints of the underlying delivery area's packet size, such as the boundaries and sizes of small fragments of the data carried in the MPU. Such small fragments are known as Media Fragment Units (MFUs). This enables the underlying delivery area entity to dynamically packetize the MPUs adaptively based on the size of the maximum transmission unit of the delivery area 304. MFUs carry small fragments of coded media data for which such fragments can be independently decoded or discarded, such as a Network Abstraction Layer (NAL) Unit of an Advanced Video Coding (AVC) bitstream.

Figure 4:
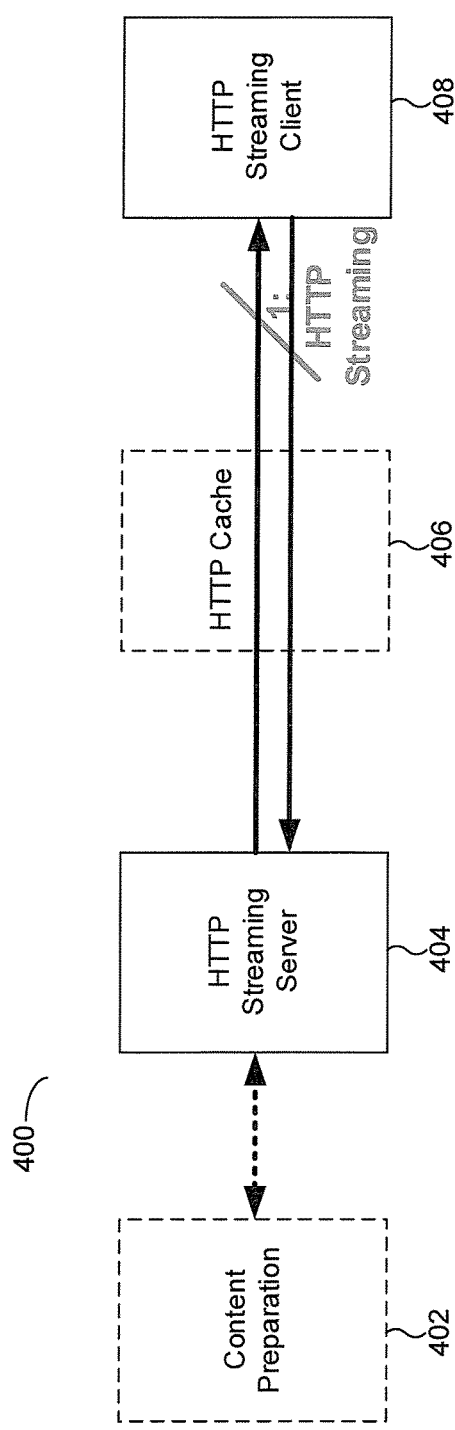
FIG. 4 illustrates an example adaptive Hypertext Transmission Protocol (HTTP) streaming (AHS) architecture according to this disclosure.

FIG. 4 illustrates an example adaptive Hypertext Transmission Protocol (HTTP) streaming (AHS) architecture 400 according to this disclosure. As shown in FIG. 4, the architecture 400 includes a content preparation module 402, an HTTP streaming server 404, an HTTP cache 406, and an HTTP streaming client 408. In some embodiments, the architecture 400 may be implemented in the system 100.

Figure 5:
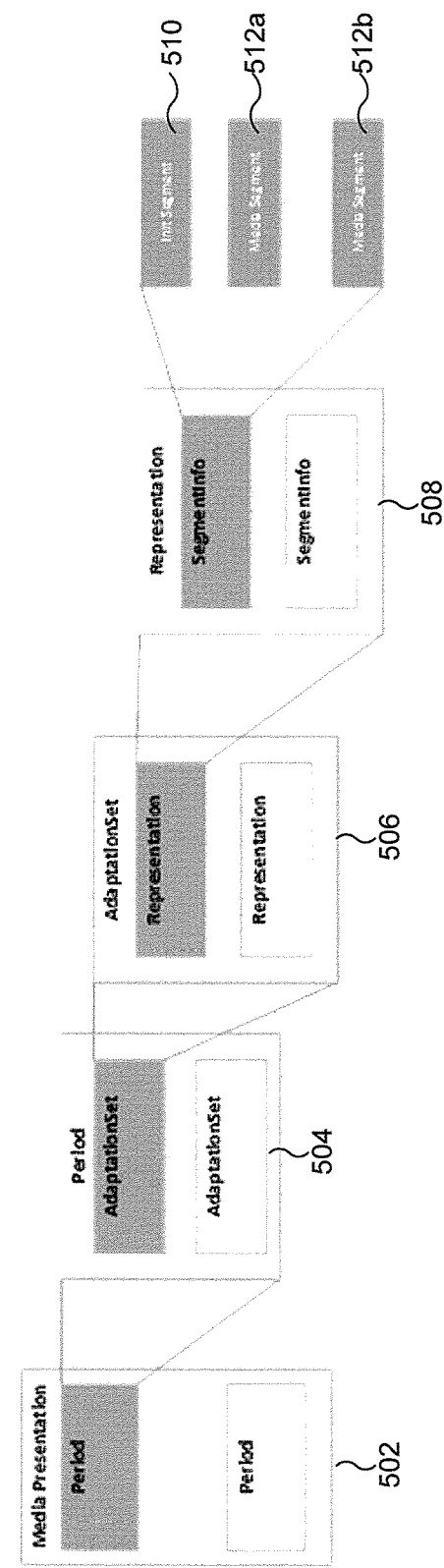
FIG. 5 illustrates an example structure of a Media Presentation Description (MPD) file 500 according to this disclosure.

FIG. 5 illustrates an example structure of a Media Presentation Description (MPD) file 500 according to this disclosure. As shown in FIG. 5, the MPD file 500 includes a media presentation 502, a period 504, an adaption set 506, a representation 508, an initial segment 510, and media segments 512a-512b. In some embodiments, the MPD file 500 may be implemented in the client device 200 as shown in FIG. 2.

Referring to FIGS. 4 and 5, in the DASH protocol, a content preparation step may be performed in which content is segmented into multiple segments. The content preparation module 402 may perform this content preparation. Also, an initialization segment may be created to carry information used to configure a media player. The information allows the media segments to be consumed by a client device. The content may be encoded in multiple variants, such as several bitrates. Each variant corresponds to a representation 408 of the content. The representations 408 may be alternative to each other or may complement each other. In the former case, the client device selects only one alternative out of the group of alternative representations 408. Alternative representations 408 are grouped together as an adaptation set 406. The client device may continue to add complementary representations that contain additional media components.

The content offered for DASH streaming may be described to the client device. This may be done using the MPD file 400. The MPD file 400 is an eXtensible Markup Language (XML) file that contains a description of the content, the periods of the content, the adaptation sets, the representations of the content, and how to access each piece of the content. An MPD element is the main element in the MPD file, as it contains general information about the content, such as its type and the time window during which the content is available. The MPD file 400 also contains one or more periods 404, each of which describes a time segment of the content. Each period 404 may contain one or more representations 408 of the content grouped into one or more adaptation sets 406. Each representation 408 is an encoding of one or more content components with a specific configuration. Representations 408 differ mainly in their bandwidth requirements, the media components they contain, the codecs in use, the languages, or the like.

Figure 6:
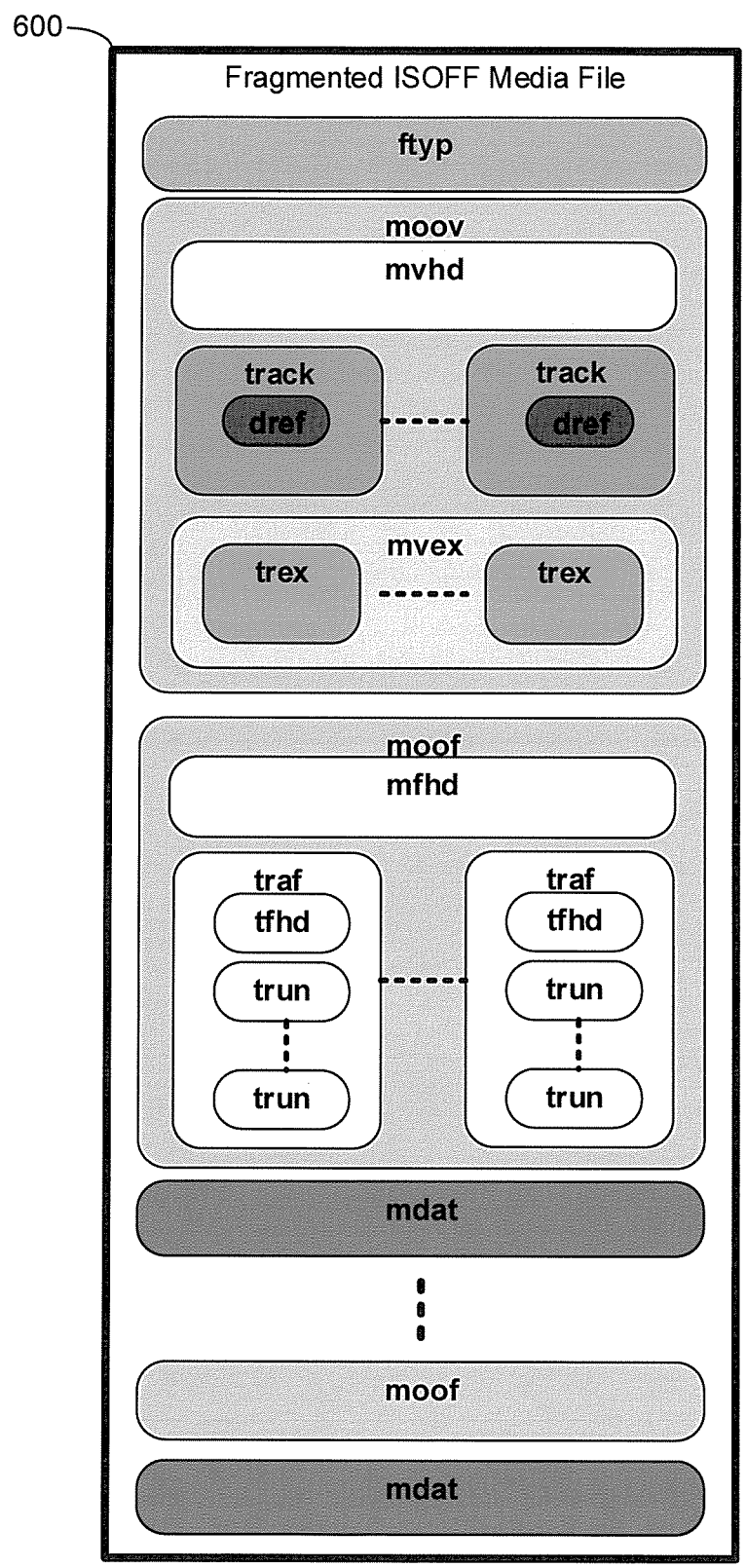
FIG. 6 illustrates an example structure of a fragmented International Standards Organization (ISO)-base file format (ISOFF) media file according to this disclosure.

FIG. 6 illustrates an example structure of a fragmented International Standards Organization (ISO)-base file format (ISOFF) media file 600 according to this disclosure. In some embodiments, the ISOFF media file 600 may be implemented in the system 100. In one deployment scenario of DASH, the ISO-base file format and its derivatives (such as the MP4 and 3GP file formats) are used. The content is stored in so-called movie fragments. Each movie fragment contains media data and the corresponding metadata. The media data is a collection of media samples from all media components of the representation. Each media component is described as a track of the file.

One or more embodiments of this disclosure recognize and take into account that even though delivery of multimedia service over HTTP is becoming more and more popular, technically it is not a very efficient solution as it adds unnecessary overheads. For example, it adds unnecessary signaling overhead as a client always needs to request media segments even if the client does not need to change anything from the current media segment. It is also difficult to implement live low-delay real-time streaming services because of the basic nature of HTTP requiring "request-send" based operations.

In DASH, the client is fully responsible for the media session and controls the rate adaptation by deciding which representation to consume at any particular time. DASH is thus a client-driven media streaming solution.

One or more embodiments of this disclosure recognize and take into account that DASH is becoming the de-fact media delivery solution using the HTTP protocol over the Internet. A large amount of content is readily available in DASH format, and it is appropriate to use the same format for distributing content over broadcast channels, as well. Currently, the only way to distribute DASH content over a broadcast channel is to use a file delivery protocol such as FLUTE for this purpose. However, FLUTE was designed to deliver files and is not appropriate for media streaming applications This disclosure provides a method and apparatus for recovering DASH segments from an MMTP session, enabling operation of a DASH client (potentially with no modifications) for the playback of the media content.

Figure 7:
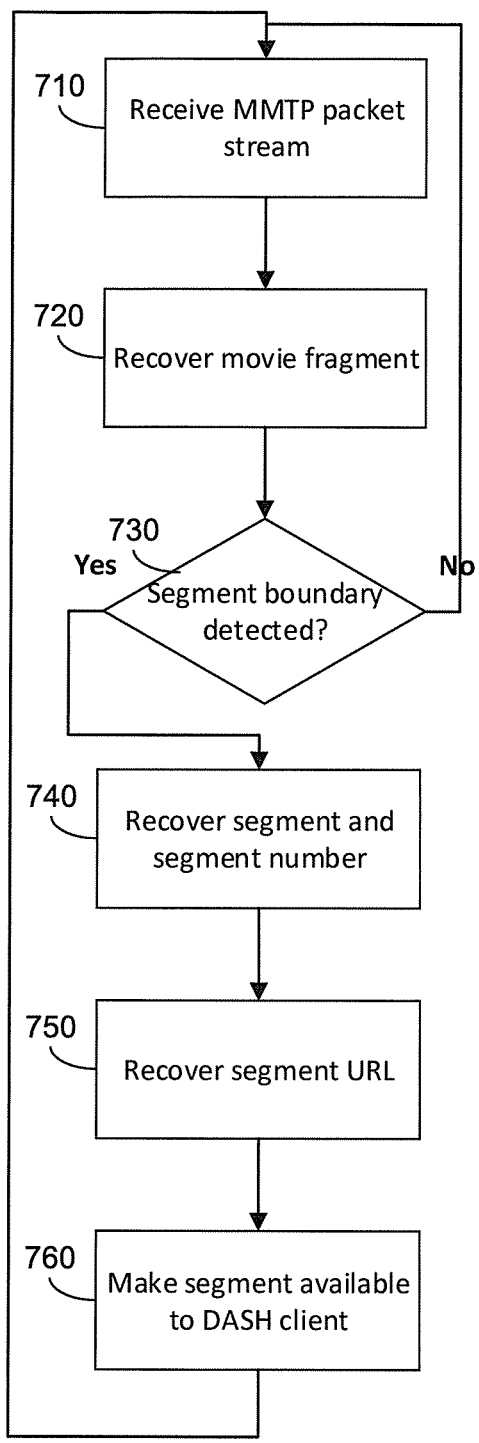
FIG. 7 illustrates a process for indicating a presentation order by a server according to this disclosure.

FIG. 7 illustrates a process 700 for indicating a presentation order by a server according to this disclosure. In an example, the client device 200 in FIG. 2 may implement the process.

In accordance with an embodiment of this disclosure, at operation 710, the client receives an MMTP packet stream. The client can receive the MMTP packet stream over a network that may include the Internet, a broadcast, cellular, Wi-Fi, and any other wireless network. The MMTP packet stream can be referred to as a data stream. The packet stream includes DASH segments movie fragment-by-movie fragment. At operation 720, the client recovers the movie fragments.

At operation 730, the client identifies whether there is a segment boundary. If there is not a segment boundary, then the client moves to operation 710. If there is a segment boundary, then at operation 740, the client recovers the segment and the segment number of that segment.

At operation 750, the client recovers the segment uniform resource locator (URL). The URL is recovered based on the segment number. At operation 760, the client makes the segment and its metadata available to the client player.

In various embodiments, DASH segments recovered through an MMTP session can be placed in an HTTP cache at the client so that the DASH player can transparently access such segments using HTTP get request.

On or more embodiments of this disclosure recognize and take into account that DASH, also known as MPEG-DASH, is an adaptive bitrate streaming technique that enables high quality streaming of media content over the Internet delivered from conventional HTTP web servers. MPEG-DASH works by breaking the content into a sequence of small HTTP-based file segments, each segment containing a short interval of playback time of a content that is potentially many hours in duration, such as a movie or the live broadcast of a sports event. The content is made available at a variety of different bit rates, i.e., alternative segments encoded at different bit rates covering aligned short intervals of play back time are made available. As the content is played back by an MPEG-DASH client, the client automatically selects from the alternatives the next segment to download and play back based on current network conditions. The client selects the segment with the highest bit rate possible that can be downloaded in time for play back without causing stalls or rebuffering events in the playback.

In an example embodiment, a controller is configured to receive a data stream over a network, the data stream comprising un-segmented media data for the content; identify segment boundaries in the un-segmented media data to identify segments; determine a segment number for each of the identified segments from a media presentation description (MPD) based on the segment boundaries; retrieve a uniform resource locator (URL) associated with each of a plurality of dynamic adaptive streaming over hypertext transfer protocol (DASH) segments based on the segment number for each of the plurality of DASH segments; and provide the URL associated with each of the plurality of DASH segments to a client player.

In an embodiment, media data can include content that is audio or video content. In an example, un-segmented media data can refer to data that is not segmented into DASH segments.

In an example of an embodiment, the controller is configured to provide metadata for the URL associated with each of the plurality of DASH segments to the client player.

In an example of an embodiment, identifying the segment boundaries in the un-segmented media data includes the controller configured to identify a segment index box in the un-segmented media data, the segment index box indicating a segment boundary.

In an example of an embodiment, identifying the segment boundaries in the un-segmented media data includes the controller configured to identify a timestamp of a sample in the un-segmented media data; determine whether a start or end time of a segment matches the timestamp; and responsive to the start or end time of the segment matching the timestamp, identify the sample as a segment boundary.

In an example of an embodiment, the data stream is received in a plurality of fragments, the sample is a first sample of a fragment, and determining whether the start or end time of the segment matches the timestamp includes the controller configured to divide the start or end time by a duration of the segment.

In an example of an embodiment, the MPD indicates the start or end time of the segments.

In an example of an embodiment, identifying the segment boundaries in the un-segmented media data includes the controller configured to identify a marker in a packet header of the un-segmented media data, the marker indicating a segment boundary.

In an example of an embodiment, the data stream is received in a plurality of fragments, and identifying the segment boundaries in the un-segmented media data includes the controller configured to receive a quantity of fragments in the un-segmented media data; and identify a segment boundary based on the quantity of fragments.

In an example of an embodiment, the data stream is received in a plurality of fragments, and identifying the segment boundaries in the un-segmented media data includes the controller configured to receive a duration for each segment; and identify a segment boundary based on the duration for the segment.

In an example of an embodiment, the segment index box indicates a beginning of a segment.

Figure 8:
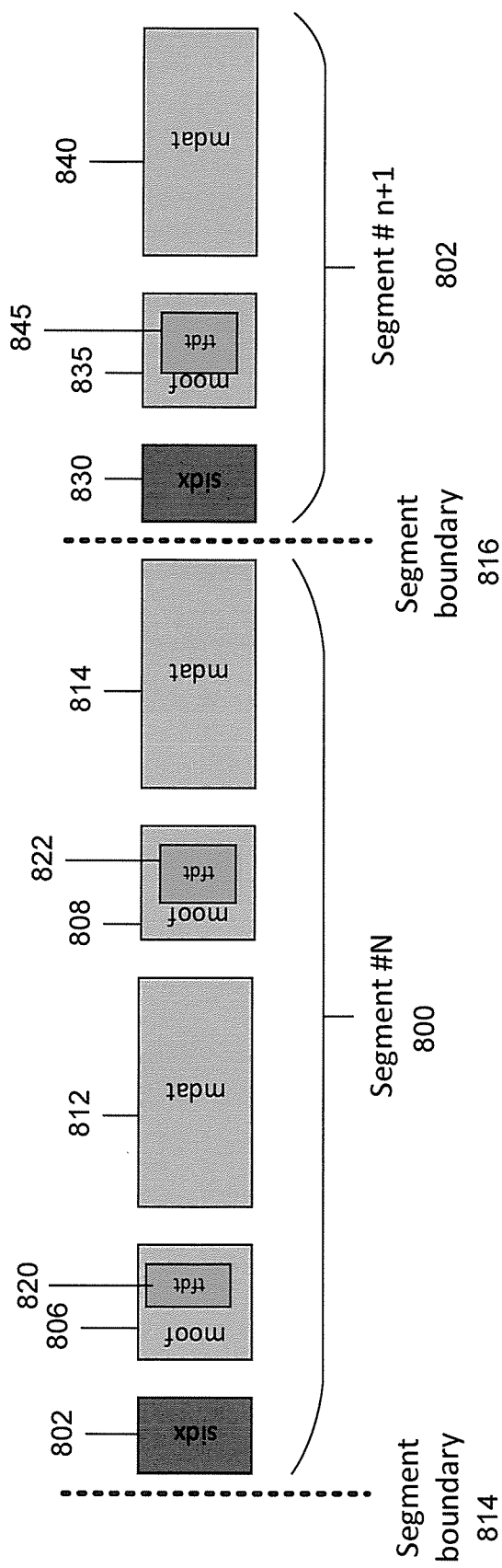
FIG. 8 illustrates an example structure of a segment according to this disclosure.

FIG. 8 illustrates an example structure of a segment 800 according to this disclosure. As shown in FIG. 8, the segment 800 includes a segment index box ("sidx") 802, movie fragments ("moof") 806 and 808, and media data ("mdat") 810 and 812. The moof 806 can include a track fragment decode time ("tfdt") box 820 and moof 808 can include tfdt box 822. A following segment 818 includes sidx 830, moof 835, and mdat 840. Moof 835 can include tfdt box 845. In some embodiments, the segment 800 may be implemented in the client device 200 as shown in FIG. 2.

In some embodiments, segment 800 is recovered by identifying boundary 814 using the presence of sidx 802 from segment 800 and the previous segment. Boundary 816 can be identified by sidx 816 of a following segment 818. In different embodiments, boundaries 814 and 816 can be identified by sidxs at the end of segments.

In other embodiments, segment 800 is recovered by checking the timestamp of the first sample in moof 806 or 808 and using the MPD to identify the media segment that has the same starting time. For example, the timestamp can be extracted from the track fragment decode time ("tfdt") box 820 or tfdt box 822. This can be done, for instance, by dividing the fragment start time by the duration of the media segment for that representation.

In yet other embodiments, a segment boundary can be signaled implicitly or explicitly by informing the client about the number of movie fragments in each media segment, by using the segment duration, or by inserting a marker as part of the packet header to indicate the start of a new segment or to provide the segment number.

It can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described in this patent document can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment, comprising:
at least one memory; and
at least one processing device coupled to the at least one memory, the at least one processing device configured to:
receive a data stream over a network, the data stream comprising un-segmented media data for content;
identify a segment index box in the un-segmented media data, the segment index box indicating a segment boundary;
identify segment boundaries based on the segment index box in the un-segmented media data to identify segments;
determine a segment number for each of the identified segments from a media presentation description (MPD) based on the segment boundaries;
retrieve a uniform resource locator (URL) associated with each of a plurality of dynamic adaptive streaming over hypertext transfer protocol (DASH) segments based on the segment number for each of the plurality of DASH segments; and
provide the URL, and metadata for the URL, associated with each of the plurality of DASH segments to a client player.

2. The user equipment of claim 1, wherein identifying the segment boundaries in the un-segmented media data comprises the at least one processing device configured to:
identify a timestamp of a sample in the un-segmented media data;
determine whether a start or end time of a segment matches the timestamp; and
responsive to the start or end time of the segment matching the timestamp, identify the sample as the segment boundary.

3. The user equipment of claim 2, wherein the data stream is received in a plurality of fragments, wherein the sample is a first sample of a fragment, and wherein determining whether the start or end time of the segment matches the timestamp comprises the at least one processing device configured to:
divide the start or end time by a duration of the segment.

4. The user equipment of claim 1, wherein the MPD indicates a start or end time of the segments.

5. The user equipment of claim 1, wherein identifying the segment boundaries in the un-segmented media data comprises the at least one processing device configured to:
identify a marker in a packet header of the un-segmented media data, the marker indicating the segment boundary.

6. The user equipment of claim 1, wherein the data stream is received in a plurality of fragments, and wherein identifying the segment boundaries in the un-segmented media data comprises the at least one processing device configured to:
receive a quantity of fragments in the un-segmented media data; and
identify the segment boundary based on the quantity of fragments.

7. The user equipment of claim 1, wherein the data stream is received in a plurality of fragments, and wherein identifying the segment boundaries in the un-segmented media data comprises the at least one processing device configured to:
receive a duration for each segment; and
identify the segment boundary based on the duration for the segment.

8. The user equipment of claim 1, wherein the segment index box indicates a beginning of a segment.

9. A method for managing content, the method comprising:
receiving a data stream over a network, the data stream comprising un-segmented media data for content;
identifying a segment index box in the un-segmented media data, the segment index box indicating a segment boundary;
identifying segment boundaries based on the segment index box in the un-segmented media data to identify segments;
in response to identifying the segment boundaries, determining a segment number for each of the identified segments from a media presentation description (MPD) based on the segment boundaries;
retrieving a uniform resource locator (URL) associated with each of a plurality of dynamic adaptive streaming over hypertext transfer protocol (DASH) segments based on the segment number for each of the plurality of DASH segments; and
providing the URL, and metadata for the URL, associated with each of the plurality of DASH segments to a client player.

10. The method of claim 9, wherein identifying the segment boundaries in the un-segmented media data comprises:
identifying a timestamp of a sample in the un-segmented media data;
determining whether a start or end time of a segment matches the timestamp; and
responsive to the start or end time of the segment matching the timestamp, identifying the sample as the segment boundary.

11. The method of claim 10, wherein the data stream is received in a plurality of fragments, wherein the sample is a first sample of a fragment, and wherein determining whether the start or end time of the segment matches the timestamp comprises:
dividing the start or end time by a duration of the segment.

12. The method of claim 9, wherein the MPD indicates a start or end time of the segments.

13. The method of claim 9, wherein identifying the segment boundaries in the un-segmented media data comprises:
identifying a marker in a packet header of the un-segmented media data, the marker indicating the segment boundary.

14. The method of claim 9, wherein the data stream is received in a plurality of fragments, and wherein identifying the segment boundaries in the un-segmented media data comprises:
receiving a quantity of fragments in the un-segmented media data; and
identifying the segment boundary based on the quantity of fragments.

15. The method of claim 9, wherein the data stream is received in a plurality of fragments, and wherein identifying the segment boundaries in the un-segmented media data comprises:
receiving a duration for each segment; and
identifying the segment boundary based on the duration for the segment.

16. The method of claim 9, wherein the segment index box indicates a beginning of a segment.

17. The method of claim 9, further comprising determining the segment number for each of the identified segments in response to identifying the segment boundaries.

18. The method of claim 9, wherein the URL associated with each of the plurality of DASH segments is retrieved after receiving the data stream.

19. The user equipment of claim 1, wherein the at least one processing device is further configured to determine the segment number for each of the identified segments in response to identifying the segment boundaries.

20. The user equipment of claim 1, wherein the URL associated with each of the plurality of DASH segments is retrieved after receiving the data stream.

* * * * *

UNITED STATES PATENT AND TRADEMARK OFFICE
CERTIFICATE OF CORRECTION

| | |
|---|---|
| PATENT NO. | : 11,310,302 B2 |
| APPLICATION NO. | : 14/592640 |
| DATED | : April 19, 2022 |
| INVENTOR(S) | : Bouazizi et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2052 days.

Signed and Sealed this
Fifteenth Day of November, 2022

Katherine Kelly Vidal
*Director of the United States Patent and Trademark Office*